United States Patent

Wheeler

[11] Patent Number: 5,918,448
[45] Date of Patent: Jul. 6, 1999

[54] COMBINE HEADER LATERAL TILT ASSEMBLY

[75] Inventor: Keith A. Wheeler, Blue Springs, Mo.

[73] Assignee: AGCO Corporation, Independence, Mo.

[21] Appl. No.: 08/797,477

[22] Filed: Feb. 6, 1997

[51] Int. Cl.⁶ .................................................. A01D 75/18
[52] U.S. Cl. ...................... 56/10.4; 56/10.2 E; 56/17.1; 56/209; 56/DIG. 10
[58] Field of Search ................... 56/10.4, 10.2 E, 56/17.1, 15.9, DIG. 10, 209

[56] References Cited

U.S. PATENT DOCUMENTS

| | | | |
|---|---|---|---|
| 2,904,949 | 9/1959 | Bell | 56/209 |
| 2,947,134 | 8/1960 | Clifford et al. | 56/209 |
| 3,731,470 | 5/1973 | Cornish et al. | 56/10.4 |
| 4,011,709 | 3/1977 | Mott et al. | 56/10.4 |
| 4,171,606 | 10/1979 | Ziegler et al. | 56/10.2 |
| 4,253,295 | 3/1981 | Knepper | 56/15.6 |
| 4,266,395 | 5/1981 | Basham | 56/209 |
| 4,573,308 | 3/1986 | Ehrecke et al. | 56/14.4 |
| 4,612,757 | 9/1986 | Halls et al. | 56/10.2 |
| 4,641,490 | 2/1987 | Wynn et al. | 56/10.2 |
| 4,733,523 | 3/1988 | Dedeyne et al. | 56/209 |
| 4,776,153 | 10/1988 | DePauw et al. | 56/10.2 |
| 5,155,983 | 10/1992 | Sheehan et al. | 56/10.2 |
| 5,155,984 | 10/1992 | Sheehan | 56/10.2 |
| 5,341,628 | 8/1994 | Schumacher, II et al. | 56/10.2 E |
| 5,359,836 | 11/1994 | Zeuner et al. | 56/10.2 E |
| 5,415,586 | 5/1995 | Hanson et al. | 460/8 |
| 5,463,854 | 11/1995 | Chmielewski, Jr. et al. | 56/10.2 E |

FOREIGN PATENT DOCUMENTS

| | | |
|---|---|---|
| 0 448 844 B1 | 12/1993 | European Pat. Off. |
| 603470 | 6/1994 | European Pat. Off. |
| 4105260 | 10/1991 | Germany. |

*Primary Examiner*—J. Woodrow Eldred
*Attorney, Agent, or Firm*—Litman, Kraai and Brown, L.L.C.

[57] ABSTRACT

A combine lateral tilt assembly which attaches a crop harvesting header to a combine includes a stationary extension of a combine feeder housing with a pair of rollers positioned on an upper surface thereof. A movable member is removably attachable to a header and includes a pair of roller tracks positioned to receive respective ones of the rollers on the stationary extension such that the movable member is substantially supported by the rollers. The movable member is mounted to tilt while riding on the rollers about an axis which is formed by a pivot pin positioned in a bottom portion of both the movable member and the stationary extension. A single hydraulic piston and cylinder unit connects between the movable member and the stationary extension to thereby selectively tilt the movable member, and the attached header, laterally relative to the combine.

11 Claims, 4 Drawing Sheets

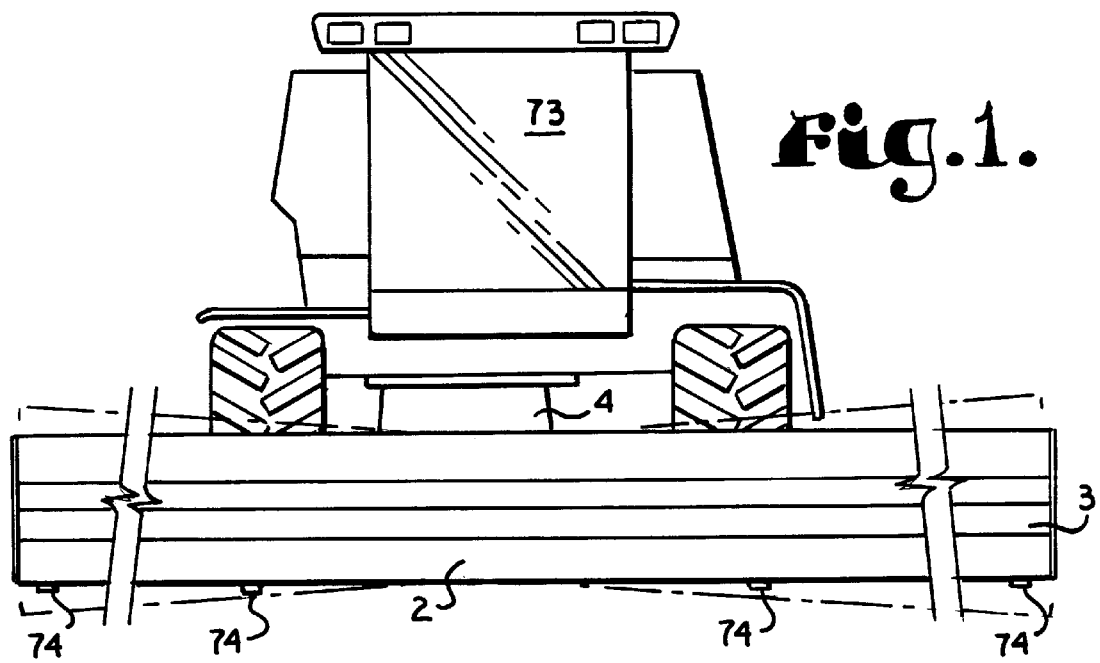
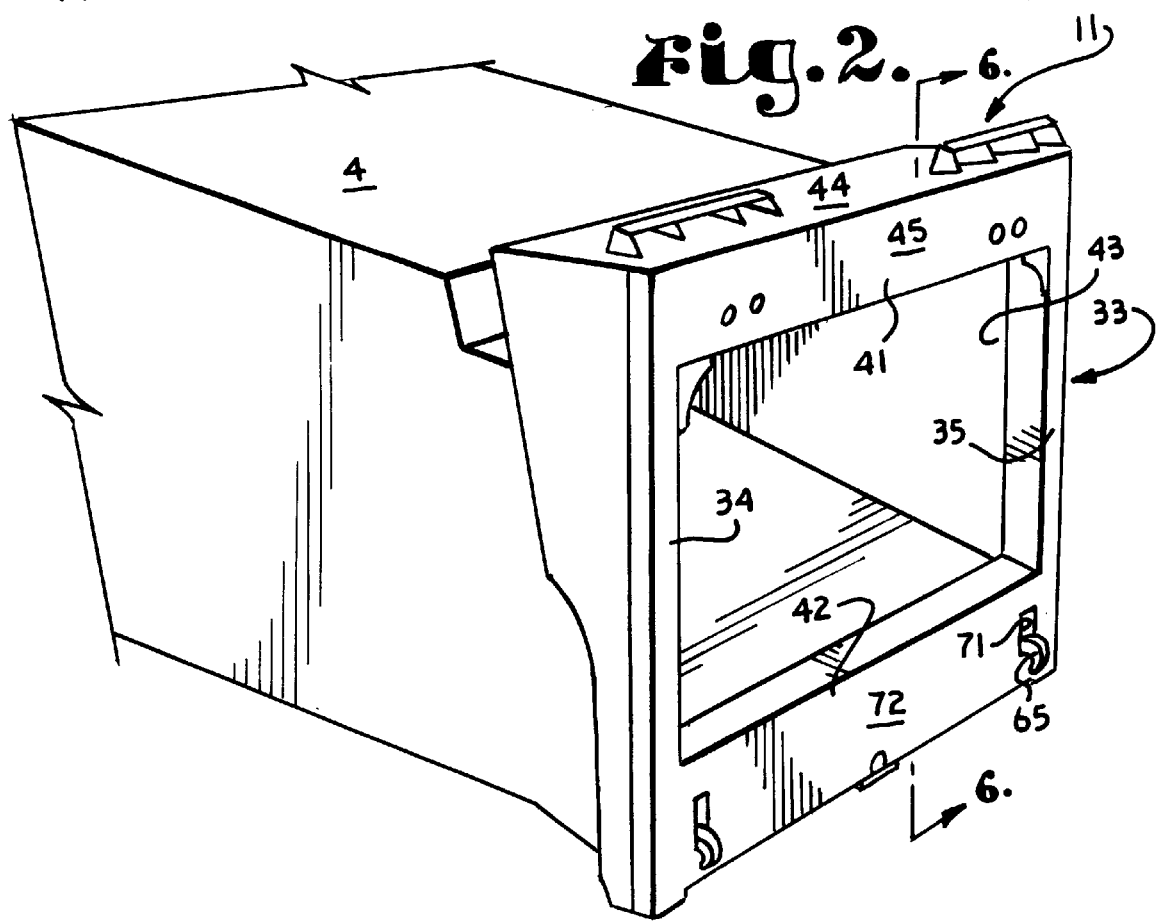

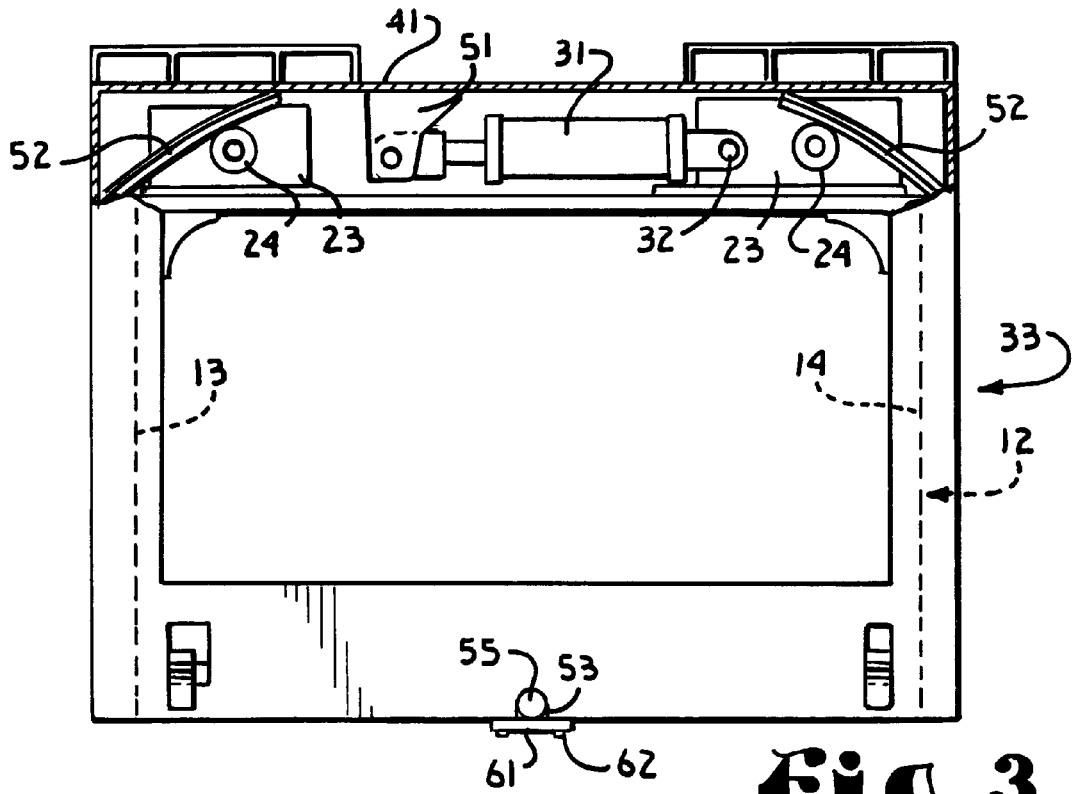
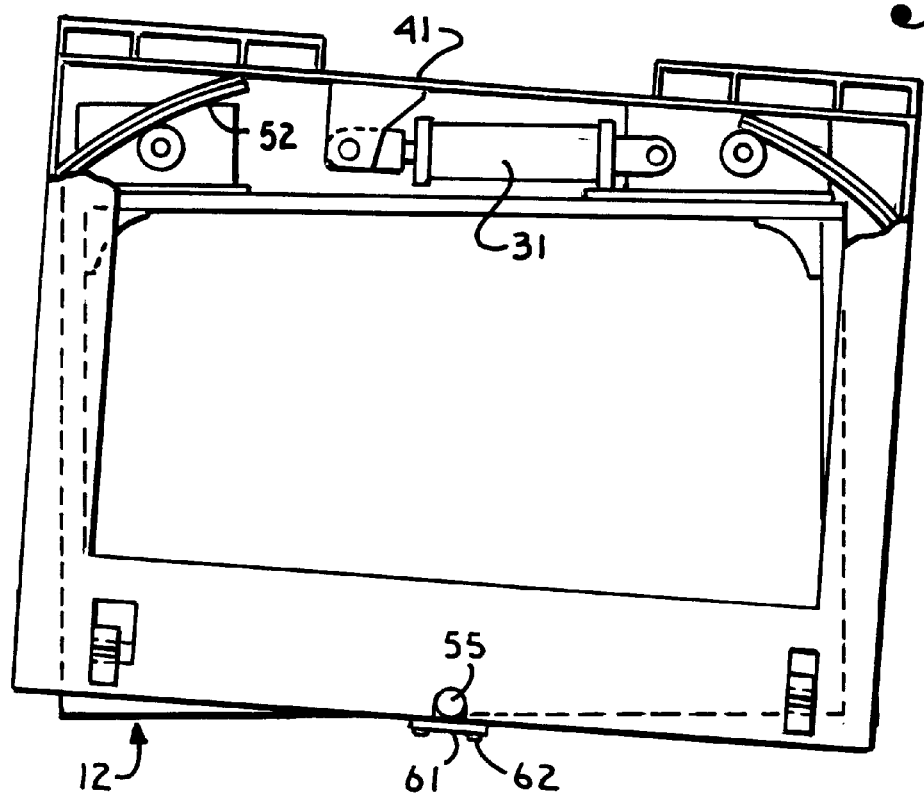
Fig.3.
Fig.4.

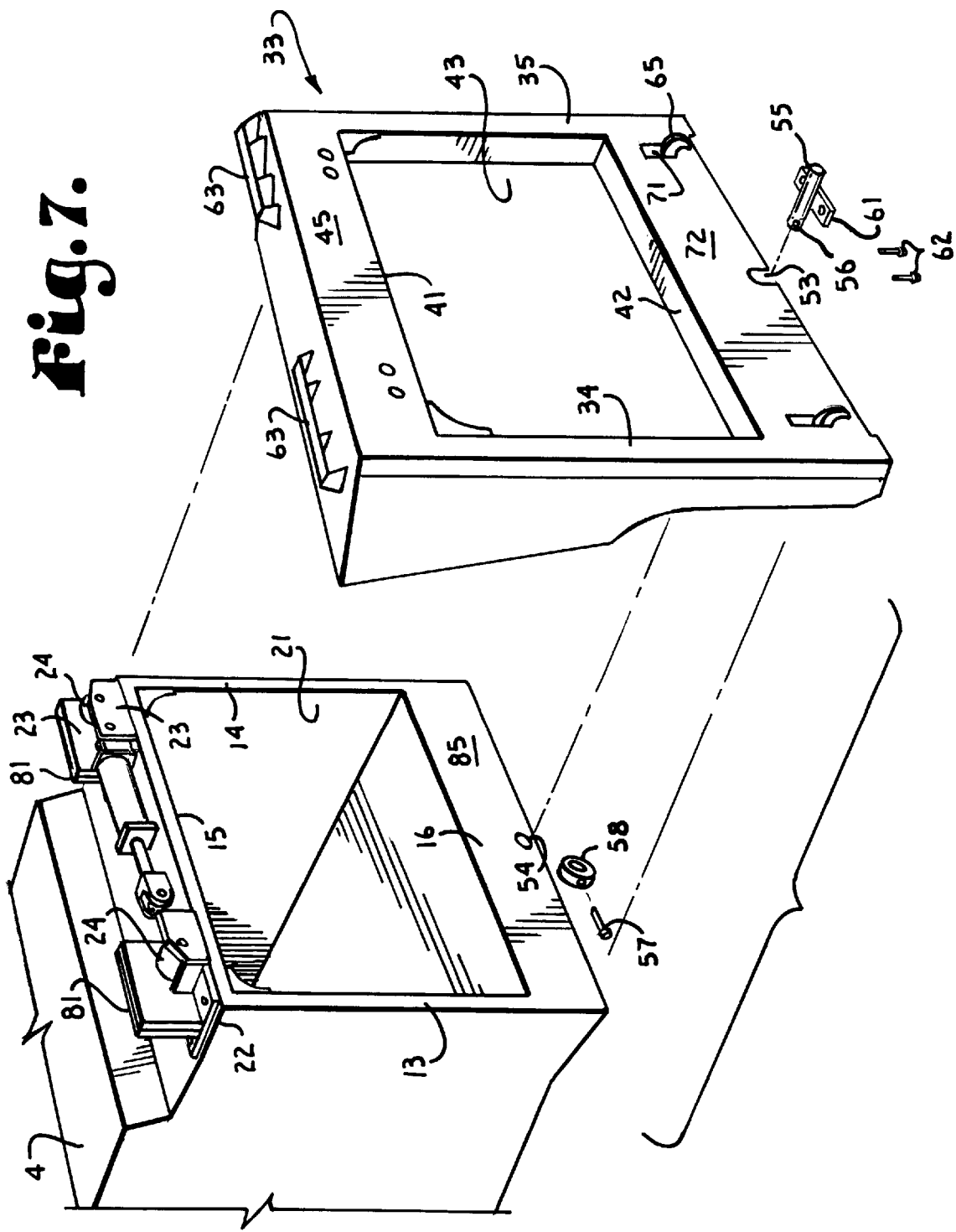

COMBINE HEADER LATERAL TILT ASSEMBLY

FIELD OF THE INVENTION

The present invention relates to a header lateral tilt assembly for an agricultural harvester, combine or swather. More particularly, the header lateral tilt assembly employs a stationary extension of the feeder housing attached to the combine with a pair of rollers positioned atop the stationary extension. A movable member is adapted for attachment to the header and includes a pair of roller tracks positioned to accommodate respective ones of the rollers in the stationary extension such that the weight of the movable member and the header are supported by the rollers. A pin inserted into a slot in the movable member and into a slot in the stationary extension holds the stationary and movable members in proper position relative to each other as the movable member is tilted relative to the stationary extension via a hydraulic piston and cylinder unit.

BACKGROUND OF THE INVENTION

Agricultural harvester/threshers or "combines" are typically equipped with harvesting "headers" which include a cutter mechanism for cutting the crop and a feeder mechanism which feeds the cut crop into the combine feeder housing mounted on the front of the combine. The cut crop material is introduced into the combine via the feeder housing where the grain is threshed and separated from the plant residue. Such combines are required to operate over a wide variety of terrains, e.g. level fields, side sloping fields, rolling hills, etc. It is important that the header be positioned parallel to the terrain or as nearly parallel as possible such that the crop is cut at a consistent height above the ground. This means that the header must often be tilted with respect to the remainder of the combine.

A variety of lateral tilting mechanisms have been devised for tilting combine headers. These mechanisms have typically been unduly ponderous and complex, and thus prone to failure in the demanding environments to which they are subjected.

An early example of such prior art header lateral tilt mechanisms is U.S. Pat. No. 3,731,470 ("the '470 patent) to Cornish et al. and entitled SELF-LEVELING COMBINE. The '470 patent teaches a complex lateral tilt mechanism with a pair of tilt cylinders which collectively, selectively tilt the "crop gathering unit". Several guides are provided for supporting a pivot member, including left and right bolt and ferrules riding in corresponding slots and with U shaped guide members cooperating with pairs of upper and lower rollers on each side of the lateral tilt mechanism.

Another example of header lateral tilt mechanism is taught in U.S. Pat. No. 4,253,295 ("the '295 patent") to Knepper and entitled LATERAL FLOAT MECHANISM FOR COMBINES. This patent describes a combine header lateral tilt control mechanism and teaches a cradle assembly attachable to the combine header and pivotably attachable to an "attachment face" of the combine. A pivot control means selectively controls the extent of pivotal movement between the cradle and the attachment face. A header attachment plate is selectively pivoted about a pivot dowel and a pair of through bolts extending through slots in the attachment plate keep the plate and the attachment face in close proximity.

In a system such as is described in the '470 patent, the complexity of the operating mechanism, including a large number of moving parts and twin operating cylinders, is a detriment since there are so many parts subject to failure or jamming with debris. In the '295 patent, the provision of a single pivot pin to both support the header attachment plate and provide the pivot axis therefore, places too much stress on a single dowel.

It is clear then, that an improved combine lateral tilt assembly is needed. Such an assembly should be simple and economical, yet rugged and durable, and should utilize a minimum of moving parts subject to contamination or failure.

SUMMARY OF THE INVENTION

The present invention is directed to a combine lateral tilt assembly which attaches a crop harvesting header to a combine. The lateral tilt assembly includes a stationary extension member forming a portion of a feeder housing on the combine with a pair of track rollers positioned in an upper surface thereof and mounted to freely roll about axes which are perpendicular to the front face of the feeder housing. A hydraulic piston and cylinder unit is attached at a first end to the upper surface of the stationary extension and at a second end to a movable member which is positioned in covering relationship with the stationary extension. The movable member includes a pair of roller tracks positioned to receive respective ones of the track rollers on the stationary extension such that the movable member is substantially supported by the track rollers. The stationary extension includes a through bore and the movable member includes a slot positioned on the bottom center thereof with the slot and through bore being aligned via a pivot pin and attached plate, with the plate held in position covering the slot by bolts with the pin retained in position in the through bore via a removable collar. Two pairs of plastic block spacers are positioned between the stationary extension and the movable member to prevent direct metal to metal contact between the movable member and the stationary extension. The movable member includes hooks which allow the header to be removably attached thereto.

As sensors on the header sense varying ground contours, the piston and cylinder unit is retracted or extended to selectively tilt the movable member and the attached header laterally about a pivot axis centered on the pivot pin. The header is thus constantly being positioned to follow the ground contour to more consistently harvest the crop.

OBJECTS AND ADVANTAGES OF THE INVENTION

The principal objects of the present invention include: providing a lateral tilt assembly for attaching a header to an agricultural combine; providing such an assembly which includes a minimal number of movable parts; providing such an assembly in which a movable member is attached to the header and a stationary extension of a feeder housing is attached to the combine with the movable member and attached header being selectively tiltable relative to the stationary extension; providing such an assembly in which a pair of track rollers positioned on the stationary extension support the weight of the movable member and header; providing such an assembly with a pivot pin which holds the movable member and stationary extension in position without supporting the weight of the header and movable member; providing such an assembly in which tilting of the movable member and header is accomplished via a single hydraulic piston and cylinder unit; providing such an assembly which is relatively impervious to dirt and debris; and providing such an assembly which is simple and economical to manufacture, which is strong and durable and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a front elevational view of a combine with a header attached, and with the header shown in solid lines in a horizontal position and in dotted lines in laterally tilted positions.

FIG. 2 is an enlarged, perspective view of a combine feeder housing with a lateral tilt assembly attached thereto, and with the header removed.

FIG. 3 is an enlarged, fragmentary front elevational view of the lateral tilt assembly, with upper portions of the movable member broken away and with the movable member shown in a horizontal position.

FIG. 4 is an enlarged, fragmentary front elevational view of the lateral tilt assembly, with upper portions of the movable member broken away and with the movable member shown tilted downward to the left (as viewed from the combine).

FIG. 7 is an enlarged, perspective, exploded view of the lateral tilt assembly.

DETAILED DESCRIPTION OF THE INVENTION

Figure 5:
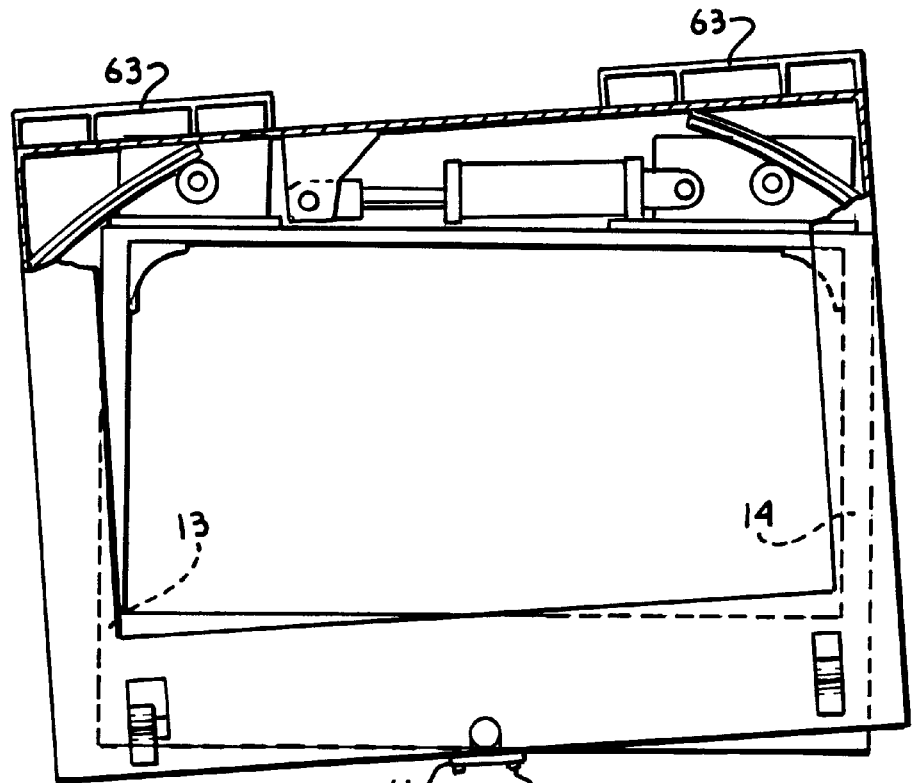
FIG. 5 is an enlarged, fragmentary front elevational view of the lateral tilt assembly, with upper portions of the movable member broken away and with the movable member shown tilted downward to the right.

As required, detailed embodiments of the present invention are disclosed herein, however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings, and more particularly to FIG. 1, an agricultural combine, generally indicated at 1, includes a crop cutter/feeder "header" 2. The header 2, which is conventional, includes a reciprocating cutter bar 3 for cutting off the crop and feeding it via an auger type feeder (not shown) to a feeder housing 4 on the combine 1. From the feeder housing 4, the cut crop is fed into the combine 1, with the grain being threshed and separated therein from the plant residue in a known manner.

Figure 6:
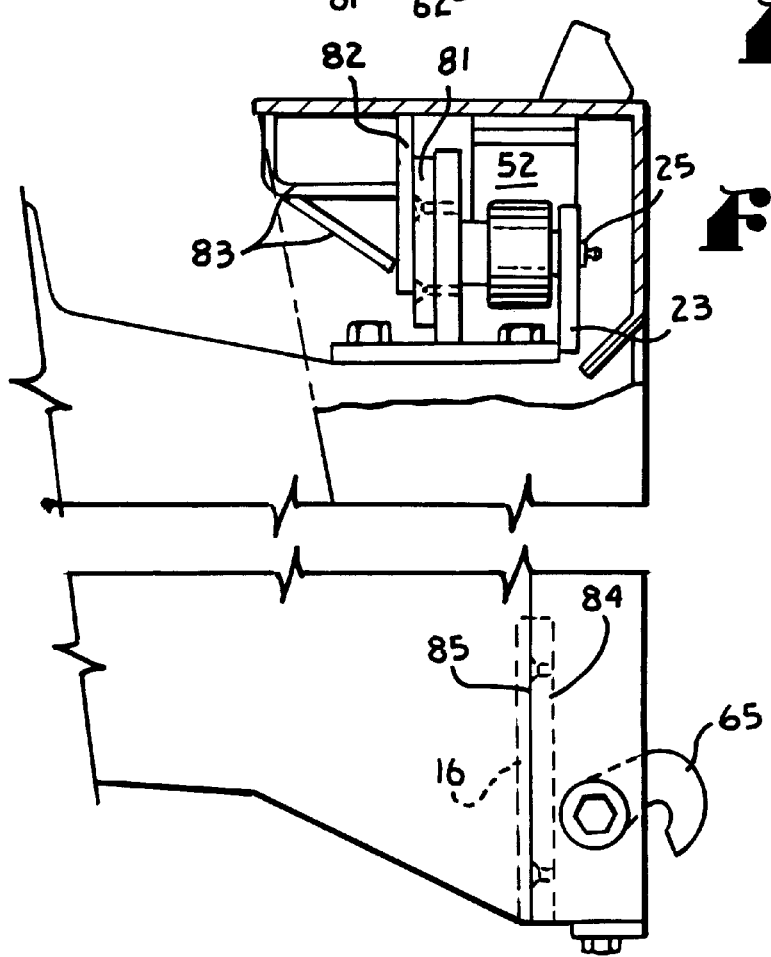
FIG. 6 is an enlarged, fragmentary side elevational view of the lateral tilt assembly, with portions of the movable member broken away to illustrate the track rollers and wear plates.

In order to cut the grain crop at a consistent height, it is important that the header 2 be selectively tiltable laterally relative to the combine 1 to thereby follow the contours of the ground over which the combine 1 operates. This is shown schematically in FIG. 1 where the header 2 is shown in solid lines in a horizontal position, and, alternatively, in dotted lines laterally tilted to the left and right. The header 2 is selectively tilted to the left or right by the inventive lateral tilt assembly, shown in detail in the remaining FIGS. 2–7. For purposes of simplicity, all of the feeding mechanism of the feeder housing has been eliminated from the drawings.

Referring to FIGS. 2–7, the lateral tilt assembly is generally indicated at 11, and includes a stationary extension 12 which forms a front face of the combine feeder housing 4. The stationary extension 12 includes left and right vertical frame portions 13 and 14, respectively, and top and bottom horizontal frame portions 15 and 16, respectively, which collectively form a generally rectangular opening 21. A generally horizontal surface 22 extends backward atop the feeder housing 4. Attached atop the upper surface 22 are a pair of roller supports 23, each of which accommodates a respective track roller 24 therein. Each roller 24 includes a support shaft 25 which extend across the respective support 23 from front to back and the rollers 24 are rotatable about their respective support shafts 25. A hydraulic piston and cylinder unit 31 is attached at a first end to one of the roller supports 23 via a pin 32.

The lateral tilt assembly 11 also includes a movable member 33, which movable member 33 includes left and right vertical frame portions 34 and 35, respectively, and top and bottom horizontal frame portions 41 and 42, respectively, which collectively form a generally rectangular opening 43 which is approximately the same size as the opening 21 and is generally aligned therewith. The top frame portion 41 includes a generally horizontal surface 44 which extends backward from a front surface 45 of the movable member 33. A clevis 51 is attached to the bottom of the horizontal surface 44, and the second end of the piston and cylinder unit 31 is attached thereto. A pair of roller tracks 52 are attached to the movable member 33 near respective upper corners thereof in positions such that each roller track 52 rests on and accommodates a respective roller 24 as the movable member 33 is positioned atop the stationary extension 12. The roller tracks 52 are preferably made of hardened steel. The weight of the movable member 33 (and the attached header 2) is thus supported by the two rollers 24 bearing on the respective tracks 52.

The movable member 33 includes a slot 53 in the bottom center of the bottom frame portion 42 which aligns with a through bore 54 near the bottom center of the stationary extension bottom frame portion 16. An elongate cylindrical pivot pin 55 includes a through bore 56 near one end thereof through which a bolt 57 is inserted to hold a retaining collar 58 in place about the pin 55. A retaining plate 61 is welded to the pin 55 near an end opposite the collar 58. The pin 55, with the plate 61 attached, is inserted through the slot 53 of movable member 33 from the front side and through bore 56 of the stationary extension bottom frame portion 16. The collar 58 is then attached to pin 55 via the bolt 57. The retaining plate 61 is bolted onto the bottom of the movable member 33 in covering relationship with the slot 53 via bolts 62. The pivot pin 55 provides a pivot point for the movable member 33, thus preventing the movable member 33 from being moved vertically or horizontally relative to the stationary extension 12 at the pivot point and the collar 58 prevents the movable member 33 from being pulled forward away from the stationary extension 12. It should be emphasized that the pivot pin 55 does not support the weight of the movable member 33, but merely acts as a movement restraining device.

The movable member 33 includes a pair of upstanding header retaining protrusions 63 which extend upward from the top horizontal surface 44 thereof and a pair of rotating header hooks 65 which extend outward through respective slots 71 in a front face 72 of the movable member bottom frame portion 42 to attach the header 2 to the movable member 33. The hooks 65 are selectively rotated manually such that the header 2 can be attached to and removed from the movable member 33, in a known fashion.

Operation

When the combine 1, with attached header 2 is in operation, a plurality of sensors 74 mounted on the bottom surface of the header 2 sense the height above ground of the header 2 at various points along its length. The sensors 74 can be any of several well known devices, including ground contacting feelers, ultrasonic emitter/receivers, etc. In a known manner, an on-board processor (not shown) processes signals from the various sensors 74 and determines whether the header 2 needs to be tilted laterally to more closely follow the ground contour. For example, if the sensors 74 along the left side of the header 2 (as viewed from the operator's position) sense a height above ground of 1 foot while the sensors 74 along the right side of the header 2 sense 2 inches, then the on-board processor would determine that a lateral tilt downward to the left would be required. The processor would then send a control signal to a hydraulic valve (not shown) which would supply fluid to the piston and cylinder unit 31 to retract the piston, thus tilting the movable member 33 to the position shown in FIG. 4, which also tilts the attached header 2 therewith. Conversely, with opposite above ground distances, the hydraulic valve would be operated to cause the piston and cylinder unit 31 to extend the piston to the extended position shown in FIG. 5, which would tilt the movable member 33 and the attached header 2 down to the right. Finally, if the sensed distances above ground on the left and right sides of the header 2 were roughly equal, then the hydraulic valve would be operated to move the piston and cylinder unit 31 back to the neutral position of FIG. 3, with the movable member 33 and the attached header 2 being returned to the horizontal position.

As the piston and cylinder unit 31 is extended and retracted, the movable member 33 pivots about the pivot pin 55 as the tracks 52 are moved over the supporting rollers 24. A pair of wear plates 81 (FIG. 6), which are preferably made of a hard plastic material, are attached to respective rear surfaces of the roller supports 23. A pair of vertically oriented retaining plates 82 are attached to and extend downward from the bottom side of the horizontal surface 44 of the movable member 33. The retaining plates 82 are braced by a corresponding braces 83. The wear plates 81 are thus positioned between respective rear surfaces of the roller supports 23 and the retaining plates 82 to prevent metal to metal contact between the supports 23 and the retaining plates 82 as the movable member 33 is tilted. Similarly, a pair of wear plates 84, also made from hard plastic or a similar material, are attached to a rear surface of the lower frame portion 42 of the movable member. The wear plates 84 are thus positioned between the lower frame portion 42 of the movable member 33 and a front surface 85 of the lower frame portion 16 of the stationary extension 12, again to prevent metal to metal contact between the two members 12 and 33 as the movable member 33 is tilted. The wear plates 81 and 84 are easily replaceable.

The present lateral tilt assembly 11 presents a number of advantages over the prior art. The inventive assembly 11 uses a single, double action piston and cylinder unit 31 with a compact movement to tilt the movable member 33 and the header 2 up to four degrees either way from horizontal. The support of the movable member 33 virtually entirely atop the rollers 24 via the roller tracks 52 insures an even, effortless tilting movement with minimal wear and tear on the components. The small number of moving parts lessens the possibility of failure due to clogging or contamination from debris.

While the rollers 24 have been shown positioned atop the stationary extension 12 and the roller tracks 52 have been shown positioned in the movable member 33, these positions can be reversed. The illustrated position of the piston and cylinder unit 31 is merely exemplary, and other positions are equally possible. While the pivot pin 55 has been shown positioned in slot 53 and through bore 54 in the bottom of the movable member 33 and stationary extension 12, respectively, the pin 55 could be moved upward in other openings or through bores to change the tilt angles of the header 2. It is thus to be understood that while certain forms of the present invention have been illustrated and described herein, it is not to be limited to the specific forms or arrangement of parts described and shown.

What is claimed and desired to be secured by Letters Patent is as follows:

1. A combine header lateral tilt assembly comprising:
   a) a feeder housing stationary extension;
   b) a movable member including attachment means for removably attaching a harvesting header thereto;
   c) at least one roller positioned on one of said stationary extension and said movable member;
   d) at least one roller track positioned on the other of said stationary extension and said movable member such that said movable member is partially supported by said roller and track and is tiltable relative to said stationary extension; and
   e) at least one wear plate positioned proximate said roller between a portion of said stationary extension and a portion of said movable member, said wear plate partially supporting said movable member and preventing horizontal metal to metal contact between said movable member and said stationary extension as said movable member is tilted relative to said stationary extension.

2. A combine header lateral tilt assembly as in claim 1, and further comprising:
   a) an opening extending through said movable member near a bottom center thereof;
   b) an opening formed in said stationary extension near a bottom center thereof; and
   c) a pivot pin positioned in said openings in said movable member and said slot in said stationary extension, said pivot pin preventing relative horizontal, vertical and forward movement between said movable member and said stationary extension.

3. A combine header lateral tilt assembly as in claim 2, and further comprising:
   a) a second roller positioned on said one of said stationary extension and said movable member; and
   b) a second roller track positioned on the other of said stationary extension and said movable member such that said movable member is supported by said rollers and tracks and is tiltable about said pivot pin relative to said stationary extension.

4. A combine header lateral tilt assembly as in claim 2, wherein:
   a) there are a pair of said wear plates each of which is positioned proximate a respective one of said rollers between respective portions of said stationary extension and corresponding respective portions of said movable member, to prevent metal to metal contact there between.

5. A combine header lateral tilt assembly comprising:
   a) a feeder housing stationary extension;
   b) a movable member including attachment means for removably attaching a harvesting header thereto, said movable member being supported by and being tiltable relative to said stationary extension;
   c) an opening extending through said movable member near a bottom center thereof;
   d) an opening formed in said stationary extension near a bottom center thereof; and
   e) a pivot pin positioned in said openings in said movable member and in said stationary extension, said pivot pin preventing relative horizontal, vertical and forward movement between said movable member and said stationary extension;
   f) at least one roller positioned on one of said stationary extension and said movable member;
   g) at least one roller track positioned on the other of said stationary extension and said movable member such that said movable member is partially supported by said roller and track and is tiltable relative to said stationary extension; and
   h) at least one wear plate positioned proximate said roller between a portion of said stationary extension and a portion of said movable member, said wear plate partially supporting said movable member and preventing horizontal metal to metal contact between said movable member and said stationary extension as said movable member is tilted relative to said stationary extension.

6. A combine header lateral tilt assembly comprising:
   a) a feeder housing stationary extension;
   b) a movable member including attachment means for removably attaching a harvesting header thereto, said movable member being supported by and being tiltable relative to said stationary extension;
   c) an opening extending through said movable member near a bottom center thereof;
   d) an opening formed in said stationary extension near a bottom center thereof; and
   e) a pivot pin positioned in said openings in said movable member and in said stationary extension, said pivot pin preventing relative horizontal, vertical and forward movement between said movable member and said stationary extension.

7. A combine header lateral tilt assembly as in claim 6, and further comprising:
   a) a second roller positioned on said one of said stationary extension and said movable member; and
   b) a second roller track positioned on the other of said stationary extension and said movable member such that said movable member is supported by said rollers and tracks and is tiltable about said pivot pin relative to said stationary extension.

8. A combine header lateral tilt assembly as in claim 6, wherein:
   a) there are a pair of said wear plates, each of which is positioned proximate a respective one of said rollers between respective portions of said stationary extension and corresponding respective portions of said movable member, to prevent metal to metal contact there between.

9. A combine header lateral tilt assembly as in claim 6, and further comprising:
   a) a piston and cylinder unit with one end connected to said stationary extension and an opposite end connected to said movable member, said piston and cylinder unit having a neutral position at which said movable member is oriented horizontally, and retracted and extended positions at which said movable member is tilted about said pivot pin in respective opposite directions relative to said stationary extension.

10. A combine header lateral tilt assembly comprising:
    a) a feeder housing stationary extension;
    b) a movable member including attachment means for removably attaching a harvesting header thereto;
    c) first and second rollers positioned near opposing top corners of one of said stationary extension and said movable member;
    d) first and second roller tracks positioned near opposing top corners of the other of said stationary extension and said movable member such that said movable member is supported by said rollers and said tracks and is tiltable relative to said stationary extension;
    e) a piston and cylinder unit with one end connected to said stationary extension and an opposite end connected to said movable member, said piston and cylinder unit having a neutral position at which said movable member is oriented horizontally, and retracted and extended positions at which said movable member is tilted in respective opposite directions relative to said stationary extension; and
    f) first and second wear plates, each of which is positioned proximate a respective one of said rollers between respective portions of said stationary extension and corresponding respective portions of said movable member, to prevent metal to metal contact there between said movable member and said stationary extension as said movable member is tilted relative to said stationary extension.

11. A combine header lateral tilt assembly as in claim 10, and further comprising:
    a) an opening extending through said movable member near a bottom center thereof;
    b) an opening formed in said stationary extension near a bottom center thereof; and
    c) a pivot pin extending through said openings in said movable member and in said stationary extension, said pivot pin preventing relative horizontal, vertical and forward movement between said movable member and said stationary extension.

* * * * *